United States Patent [19]

Pogorski et al.

[11] 4,274,158
[45] Jun. 23, 1981

[54] EVACUATED DIVING SUIT INSULATION

[75] Inventors: Louis A. Pogorski, Toronto; Lorne A. Kuehn, Downsview, both of Canada

[73] Assignee: Her Majesty the Queen in right of Canada, as represented by the Minister of National Defence, Ontario, Canada

[21] Appl. No.: 26,304

[22] Filed: Apr. 2, 1979

[30] Foreign Application Priority Data

Apr. 14, 1978 [CA] Canada .................................. 301157

[51] Int. Cl.³ .............................................. A62B 17/00
[52] U.S. Cl. .......................................... 2/2.1 R; 2/82; 428/71; 428/310; 428/315
[58] Field of Search ..................... 2/2.1 R, 2.1 A, 81, 2/82; 428/71, 310, 315

[56] References Cited

U.S. PATENT DOCUMENTS

| | | | |
|---|---|---|---|
| 3,307,540 | 3/1967 | Link | 128/142.3 |
| 3,337,876 | 8/1967 | Armstrong | 2/82 |
| 4,099,342 | 7/1978 | Singh | 428/310 X |

FOREIGN PATENT DOCUMENTS

861470 1/1971 Canada .................................. 428/310

Primary Examiner—H. Hampton Hunter

Attorney, Agent, or Firm—Stevens, Davis, Miller & Mosher

[57] ABSTRACT

An insulating material suitable for use in a diver's garment or garment-like apparatus. The insulating material comprises a multiplicity of layers of a flexible, stretchable material. These layers include a central core consisting of a gas permeable, preferably multicomponent, layer of a material that is substantially non-compressible when at least partially evacuated and subject to hydrostatic pressure when immersed in water. Two further and gas impermeable layers are provided, each of these further two layers being of a stretchable material with the central core being disposed intermediate to said layers. When formed into a diver's garment, the peripheral edges of the insulating material are sealed, and sealable closure means are provided in at least one of the gas impermeable layers to communicate with the central core. This closure means is conveniently in the form, for example, of a valve and valve stem arrangement, whereby the central core can selectively be placed under superatmospheric or sub-atmospheric pressure. The gas permeable core preferably comprises a multiplicity of lamina of a knitted fabric stretchable in two directions such as hosiery material of nylon or perlon and may be impregnated by particulate matter.

17 Claims, 4 Drawing Figures

EVACUATED DIVING SUIT INSULATION

This invention relates to insulation materials generally. More particularly the invention relates to insulation materials and an insulating garment or garment-like apparatus suitable for wear by a diver in a cold water environment.

BACKGROUND OF THE INVENTION

A human diver in a cold water environment is subject to a considerable heat loss or drain. So great is this heat drain that, in the absence of adequate thermal protection, i.e., insulation, his body becomes hypothermic. This means that the body temperatures decrease, not only externally or peripherally, but also internally, as manifested in the inner core temperature. A human's body core temperature must be maintained at about 37° C. for comfort and safety.

Water temperatures in most parts of the world are normally substantially less than this required human body core temperature. Indeed, water temperatures in the oceans, lakes and rivers of the temperature zones of the world are frequently in the range from about 0° C. to said +15° C. Water has a high specific heat and thermal conductivity compared to air, the normal environment for humans. A human body in water, therefore, will be subject to considerable convective thermal stress due to heat loss driven by the temperature differential between the body and the surrounding water.

Thus, whether a human being is in water for recreation, by virtue of an accident, or working as in the case of divers, the body is subject to the convective thermal stress mentioned above. Regardless of the circumstances, it is very important to maintain the body's core temperature at about 37° C. A drop of core temperature of 2° C., resulting from a heat loss of about 150 kilocalories, can cause mental deficiencies detremental to the safety of the person. A total body heat loss of about 700 kilocalories with a further drop in the core temperature of 5° C. to about 30° C. usually will result in unconsciousness and heart failure.

The actual time taken to undergo a 2° C. or 7° C. drop in body core temperature will vary. The variation can be from only several minutes to up to about an hour, for an unprotected body in extremely cold water. In any event, the human body is incapable of defending itself against the rate of heat loss in such water.

Thus it is essential to provide for a diver or other person in cold water adequate thermal protection during the time such a person is undergoing substantial convective heat loss.

SUMMARY OF THE PRIOR ART

Two types of thermal protective systems are frequently used to protect divers in cold water. These are by means of passive insulation, or by dynamic protection.

Passive insulation consists of special clothing or fabrics which reduce the amount of heat lost by the diver. Such clothing is designated as "wet" insulation if water from the environment is able to move into or underneath it, such that the diver's skin is wet. An example of this clothing is the foam neoprene wet suit commonly used by shallow-water divers. Another designation of this clothing type is that of "dry" passive insulation which is so constructed that the diver's skin is kept dry by having the outer shell of the clothing made of a water-impremeable material under which various amounts of dry insulation can be worn. An example of this clothing is the "Unisuit" made of foam neoprene which is water impermeable and which is customarily used by deep-water divers.

Dynamic protection consists of a means whereby heat is conveyed to or produced on the surface of the diver's body. Several varieties of this system have been moderately successful. The Dick Long suit is a loose-fitting clothing shell through which hot water usually from a surface-mounted generator is allowed to flow, heating the diver. Other varieties include electrical resistive heating on the diver from a carried or externally-placed electrical supply as well as closed-circuit hot water insulation schemes within the structure of clothing as in certain models of the "Piel" suits.

However, there are for example, the following limitations or drawbacks to these present day protective systems. Passive systems do not provide sufficient warmth for more than one or two hours of cold water diving after which diver hypothermia steadily progresses. Wet suits provide protection only in shallow water. The dry suits are good to only moderately deeper depths if they are made from closed-cell neoprene. This is because the compression of the gas bubble inside of the closed cells and the resulting reduction in thickness of the neoprene reduce the insulating capability of the material as the depth or hydrostatic pressure increases. The thickness of a foam neoprene slab is reduced, for example, by 50% at a depth of 100 ft. Use of highly conductive breathing gases such as oxyhelium causes a further reduction in diver thermal insulation.

Certain diving suits are made with an elastomer matrix in which glass microspheres or microballoons (hollow glass spheres) have been embedded in order to decrease the overall compressibility and conductivity of the material while retaining its flexibility. However, these diving suits afford only limited protection at great depths because of a back diffusion of air into the microballoons which tends to increase the overall conductivity of the material with time and pressure.

Dynamic systems do provide sufficient warmth for diver comfort and protection but at great expense and only when the diver can be safely supported by an umbilical cord from a surface-support ship or diving bell. Dynamic systems are not cost-effective.

Heretofore, attempts have been made at providing improved thermally insulating materials or systems. One such improvement is described in Canadian Pat. Nos. 861,470 and 880,867 which were jointly issued on Jan. 19, 1971 and Sept. 14, 1971, respectively, to Gulf Oil Canada Ltd. and Chemical Projects Ltd. In essence, however, the arrangements described in those two patents teach thermal protection for a container or pipe. The present invention introduces improvements required for the protection of a highly mobile diver in a liquid environment, i.e., cold water.

SUMMARY OF THE INVENTION

The present invention is believed to advance greatly the art of thermal protection for divers or other persons in cold water. Accordingly, it is an object of one aspect of this invention to provide a heat insulating apparatus that is flexible, relatively light in weight, and durable.

Another object of a preferred form of this invention is to provide a garment-like heat insulating apparatus that is comfortable to wear, and is relatively easy to put on and take off. Thus, the present invention provides improved thermal protection for a person in cold water, and numerous advantages not obtainable with prior art systems/materials.

Accordingly, there is provided by this invention an insulating material suitable for use in diving suits and the like, comprising a multiplicity of layers of a flexible, stretchable material, said layers including a central core consisting of a gas permeable layer of a material that is substantially non-compressible when at least partially evacuated and subject to hydrostatic pressure when immersed in water; said layers further including two other layers impermeable to gaseous fluids, each of said two other layers being of a stretchable material, the central core being disposed intermediate said two other layers. The gas permeable core may be impregnated with particulate matter, and preferably, is of multiple components, i.e., a multicomponent layer.

One of the preferred embodiments of this invention provides a diver's garment suitable for wear by a diver in a cold submarine environment; said garment having arm and leg sections, and a body section, said sections being joined together and provided with at least one fastening means to enable the garment to be put on and taken off; each section of said garment comprising a multiplicity of layers of a flexible, stretchable material, and including a central core consisting of a gas permeable layer of a material that is substantially incompressible when at least partially evacuated and subject to a hydrostatic pressure in said submarine environment, said layers further including two other layers each impermeable to gaseous fluids and being positioned on opposite sides of the central core, there further being provided sealable closure means in one of the gas impermeable layers, thereby to enable the central core, selectively, to be placed under a sub-atmospheric or superatmospheric pressure.

Another preferred embodiment of this invention provides a two-piece diver's garment suitable for wear by a diver in a cold submarine environment; said garment having an upper section consisting of a pullover type jacket complete with hood, sleeves and gloves and extending to below the waist, and of a lower section consisting of pullover type trousers complete with feet cover and extending to the arm pits; each section of said garment comprising a multiplicity of layers of a flexible, stretchable material, and including a central core consisting of a gas permeable multicomponent layer of a material that is substantially incompressible when at least partially evacuated and subject to a hydrostatic pressure in said submarine environment, said layers further including two other layers each impermeable to gaseous fluids and being positioned on opposite sides of the central core, there further being provided sealable closure means in one of the gas impermeable layers, thereby to enable the central core, selectively, to be placed under a sub-atmospheric or superatmospheric pressure. The separate sections of the diving garment may be joined together, if preferred, by a removable gas and fluid impermeable adhesive strip or belt made of an elastomeric material impregnated with a pressure sensitive adhesive on the inner side.

These and other aspects of this invention will be described in more detail below. That description is to be read in conjunction with the accompanying drawings in which:

DESCRIPTION OF THE PREFERRED EMBODIMENT

Figure 2:
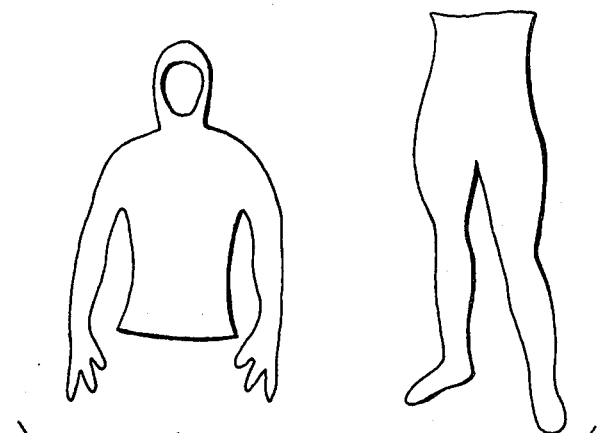
FIG. 2 is also a schematic view of a two-piece diver's suit embodying this invention.
Figure 3:
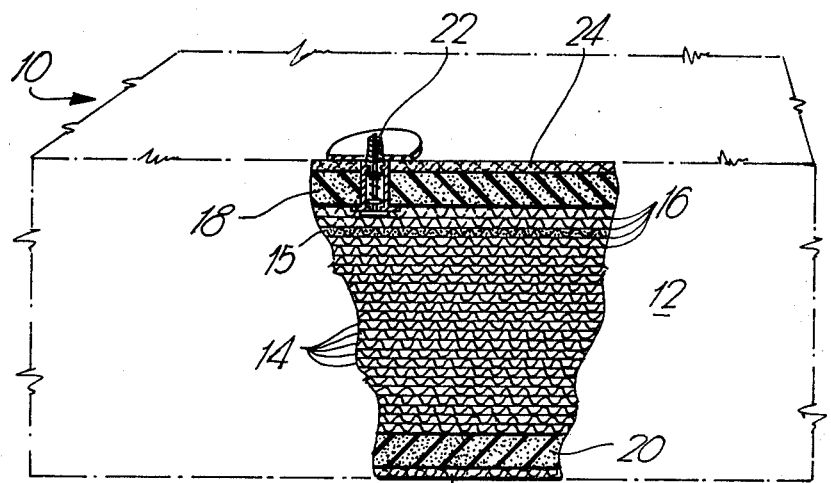
FIG. 3 is an elevation view taken in cross-section of thermal insulating material embodying this invention, said view being on a greatly exaggerated scale.
Figure 1:
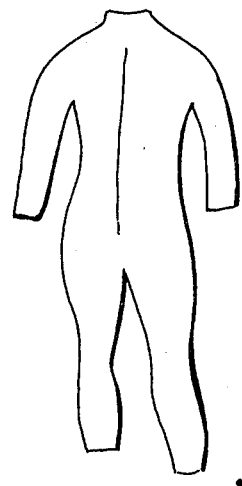
FIG. 1 is a schematic view of a one-piece diver's suit embodying this invention.

A greatly enlarged segment of an insulating material 10 is shown in cross-section in FIG. 3. This insulating material 10 comprises a multiplicity of layers of a flexible material, stretchable in two directions. A central core 12 consists of a fabric stretchable in two directions. This core 12 includes a great many lamina 14 of a knitted fabric. Super-imposing the lamina 14 creates a mat-like structure having many open pockets or cells therein. Each of such pockets or cells is tiny in size, and tends to provide a finite, but limited amount of communication from one cell to another. This communication is for a gaseous fluid such as air. However, due to the existence of the discrete, individual cells, any tendency to establish convective flow currents within the core 12 is minimized. This tendency to establish convective currents can be further impeded by the introduction of optional particulate matter 15 inside one or more lamina 14 of the core. When the dimensions of the open cells, i.e., the free distances between the points of contact of the lamina or of the optional particulate matter 15, are of the same order of magnitude as the length of the molecular free path of the interstitial gas at the given pressure and temperature, the conductivity of the core will be smaller than the conductivity of the interstitial gas. This feature is one of rendering the core 12 gas permeable and evacuable while still retaining effectiveness as an insulating barrier. This effectiveness as an insulating barrier has been demonstrated with as few lamina as five (5). Furthermore, the basic flexibility needed for use in a diver's garment or apparatus has been maintained with as many lamina as forty (40). Thus a range in the number of lamina 14 from 5 to 40 has been found to be useful.

The core 12 is preferably made of a multiplicity of lamina, each consisting of a knitted fabric of a natural or synthetic yarn. Knitted fabric in the form of hosiery material, made of, for example, nylon or perlon, has been found to be quite suitable.

Figure 4:
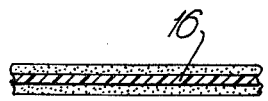
FIG. 4 is a schematic view showing some detail of one aspect of the invention illustrated in FIG. 3.

Alternative or additional materials for use in the lamina 14 of the gas permeable core 12 are particulate matter (e.g. natural or synthetic, preferably non-hygroscopic), extended surface powders (e.g. carbon, "Teflon"* polyethyelene, polypropylene, wool), or mat or quilt-like masses of natural fibers of long or short dimensions such as wool or cotton, or synthetic fibers (e.g. nylon, perlon). A thin, for example, 0.002" thick, adhesive coating may be used to bond or connect one lamina 14 to another at one or more points. In certain instances entire faces of the lamina 14 may be coated with an adhesive, or the adhesive can be applied in lines, etc. on the face of the lamina. The tape or film 16 is commonly of "MYLAR" (tradename), or polyethylene. This film or tape 16 (see FIG. 4) can be metalized as well, if desired, to act as a reflector for infrared heat energy radiated by a diver's body. The metalized face would normally be on the surface toward the diver's body, i.e. on the side where the highest temperature occurs.

* A trademark for a polytetrfluoroethylene of the DuPont Company.

On opposite sides or faces of the central core 12 there are provided first and second layers 18 and 20 respectively of gas and water impermeable films or closed-cell foams. The layers 18 and 20 normally are of a material such as neoprene rubber (commonly used in the past in diver's suits in the form of a closed-cell foam), butyl rubber, nitryl rubber, hypalon or natural rubber.

In accordance with one aspect of this invention, at least one of the gas impermeable layers 18 or 20 is provided with a sealable closure 22. Closure 22 is conveniently in the form of a valve and stem combination that is operable so as to enable, selectively, placing the central core 12 under a superatmospheric or sub-atmospheric pressure. To prevent leakage of air into the core 12, the closure 22 will have a biasing spring or the like, operative to seal the valve positively. The arrangement shown at 22 in the drawing illustrates this schematically.

It is to be appreciated that to assist in the inflation or deflation or various sections of the diver's garment, several sealable closures 22 can be provided. At least one will be provided in each section sealed off from other sections of the diver's garment or apparatus. The required degree of inflation or deflation can be accomplished by a hand operated vacuum-pressure pump attached to the diving garment or by an external power operated pump.

In accordance with another feature of the preferred embodiment of this invention, an outer and an inner layer 24 and 26 are provided. These two layers 24 and 26 are conveniently made of a knitted nylon fabric, stretchable in two directions. The outer layer 24, being outer in a sense relative to the side on which the diver's skin is found, functions to protect the gas impermeable layer 18 from cuts and scratches. Thus, greater durability is provided to the diver's garment without sacrificing flexibility. On the other hand, the layer 26 being the layer adjacent or closest to the diver's skin, i.e. body, may be conveniently made of a knitted fabric consisting of a nylon, cotton or wool fiber, sublayers or of a nylon, cotton or wool fiber blend. This layer 26 serves primarily to absorb perspiration from the diver's body in the case of a so-called "dry suit" where wrists, ankles and neck openings seal with the skin of the diver or in the case of a two-piece "dry suit". It also permits easy donning and doffing of the garment. In the case of a "wet suit" this layer 26 would function to minimize the extent of convective heat loss to water moving around between the diver's skin and his diving suit. Additional optional means of absorbing perspiration may be provided. The preferred absorption means consists of finely divided absorbent material, such as granular silica gel, encased in gas permeable bags or cartridges strategically placed inside of the diving suit.

In the segment of insulating material embodied by the present invention, the central core 12 is in the order ⅛ to ½ inch, preferably ¼ to ⅜ inch thick. Each of the adjoining layers 18 and 20 is normally less thick than the primary insulating layer (central core 12), being in the range from about 0.02 inch to about 0.06 inch thick. The outermost protective layers 24 and 26 are commonly 0.010–0.0625 inch thick.

The above thicknesses can be varied somewhat, depending largely on the temperatures of the marine environment in which a suit of this material is to be used. By using a composite of layers or lamina of different materials, the function of each can be optimized more readily. Thus, considerable flexibility is retained in a diver's garment or diving apparatus.

One specific embodiment of this invention involved construction of a diver's garment or apparatus to be worn by the driver. Such a garment consisted of a body section to which there was integrally joined two arm sections and two leg sections. The body section had a zipper which preferably closed and sealed the garment when it was put on. Also, the garment was in the form of a so-called "dry suit". The insulating material which embodies this invention, was in this instance of a sandwich construction comprising a central core of 40 lamina or layers of a two-way stretch nylon knit, on the face of each lamina there being lines of an adhesive for joining the layers together. The core material was in the range of approximately 0.25 to 0.40 inch thick. To the outermost lamina of the central core there is adhesively secured a 1/16 inch layer of a closed cell neoprene rubber foam. (Subsequently, a butyl rubber sheet material could be added to provide the exterior wear resistant layer.) Further, in this particular instance, an innermost layer of a natural fiber, a cotton twill, was used. A suitable valve and valve stem combination was also provided, in the layers of neoprene foam and butyl rubber, to enable the central core to be connected selectively to a source of sub-atmospheric or superatmospheric pressure.

It has been found convenient to inflate the central core slightly, when putting the diver's garment or apparatus on. Subsequent to donning, the central core is evacuated and placed under a slight vacuum. This vacuum tends to remain for several hours, normally beyond the duration of the dive made when wearing this garment. The overall thickness of the insulating material before evacuation is preferably in the order of 1.00 inch for this version containing 40 lamina of a knitted hosiery material in the central core. Upon partial evacuation, this thickness is reduced to about 0.40 inches. Such an arrangement provides improved insulating properties, but retains the stretch and flexibility needed by a diver to perform work in a submarine environment.

The present disclosure describes two preferred embodiments of this invention. Some modifications and changes have also been suggested. It is intended to cover all such changes apparent to those skilled in this art, and encompassed by the claims below.

The embodiments of the invention in which an exclusive property or privilege is claimed are defined as follows:

1. An insulating material suitable for use in diving suits and the like, comprising a multiplicity of layers of a flexible, stretchable material, said layers including a central core consisting of a gas permeable layer of a material that is substantially non-compressible when at least partially evacuated and subject to hydrostatic pressure when immersed in water; said layers further including two other layers impermeable to gaseous fluids, each of said two other layers being of a stretchable material, the central core being disposed intermediate said two other layers and means connected to said central core for selectively inflating and deflating it.

2. The insulating material defined in claim 1, wherein the central core consists of a gas permeable multicomponent layer of material.

3. A diver's garment or garment-like apparatus comprising a quantity of the insulating material defined in claim 1, said quantity of insulating material being fashioned in the form of apparel suitable for wear by a diver, and having peripheral edges sealed, said means connected to said central core being a sealable closure means, said closure means being mounted in one of the two gas impermeable layers to connumicate with said central core, whereby said central core can selectively be placed under superatmospheric or sub-atmospheric pressure.

4. The apparatus defined in claim 3, wherein said closure means comprises a pneumatically operable combination of a valve and valve stem.

5. The invention defined in one of claims 1, 3 or 4, wherein the gas permeable layer comprises a multiplicity of lamina of a knitted fabric stretchable in two directions.

6. The invention defined in one of claims 1, 3 or 4, wherein the gas permeable core comprises a multiplicity of lamina of a knitted fabric stretchable in two directions, said knitted fabric being one of, perlon or nylon synthetic yarn or of natural yarn such as wool.

7. The invention defined in claim 1, 3 or 4, wherein the gas permeable core is disposed between two gas impermeable layers, and there is further provided an inner layer and an outer layer on the side of each gas impermeable layer opposite to the central core, said inner and outer layers comprising a two-way stretchable fabric that is abrasion resistant.

8. The invention defined in one of claims 1, 3 or 4, wherein the gas impermeable layers comprise one of a neoprene, nitryl, butyl, hypalon or natural rubber.

9. A diver's garment suitable for wear by a diver in a cold submarine environment; said garment having arm and leg sections, and a body section, said sections being joined together and provided with at least one fastening means to enable the garment to be put on and taken off; each section of said garment comprising a multiplicity of layers of a flexible, stretchable material, and including a central core consisting of a gas permeable multi-component layer of a material that is substantially incompressible when at least partially evacuated and subject to a hydrostatic pressure in said submarine environment, said layers further including two other layers each impermeable to gases and fluids and being positioned on opposite sides of the central core, there further being provided sealable closure means in one of the gas impermeable layers, thereby to enable the central core, selectively, to be placed under a sub-atmospheric or superatmospheric pressure.

10. A two-piece diver's garment suitable for wear by a diver in a cold submarine environment; said garment having an upper section consisting of a pullover type jacket complete with hood, sleeves and gloves and stretching to below the waist and of a lower section consisting of pullover-type trousers complete with feet covering and extending to the arm pits; each section of said garment comprising a multiplicity of layers of a flexible, stretchable material, and including a central core consisting of a gas permeable layer of a material that is substantially incompressible when at least partially evacuated and subject to a hydrostatic pressure in said submarine environment, said layers further including two other layers each impermeable to gases and fluids and being positioned on opposite sides of the central core, there further being provided sealable closure means in one of the gas impermeable layers, thereby enabling the central core selectively to be placed under a sub-atmospheric or superatmospheric pressure.

11. The invention defined in claims 9 or 10 wherein the gas permeable layer comprises a multiplicity of lamina of a knitted fabric stretchable in two directions.

12. The invention defined in claims 9 or 10 wherein the gas permeable core comprises a multiplicity of lamina of a knitted fabric stretchable in two directions, said knitted fabric being one of, perlon or nylon synthetic yarn.

13. The invention defined in claims 9 or 10 wherein the gas permeable core is disposed between two gas impermeable layers, and there is further provided an inner layer and an outer layer on the side of each gas impermeable layer opposite to the central core, said inner and outer layers comprising a two-way stretchable fabric that is abrasion resistant.

14. An invention according to claims 9 or 10 in which the upper and lower sections of the diving garment are joined together by a removable gas and fluid impermeable adhesive strip or belt made of an elastomeric material impregnated with a pressure sensitive adhesive on the inner side.

15. An invention according to claims 9 or 10 in which the diving garment is evacuated by means of a hand operated pressure-vacuum pump attached to said garment.

16. An invention according to claims 9 or 10 in which the excess perspiration is removed by finely divided absorbent material, such as silica gel, encased in gas and fluid permeable bags or cartridges strategically placed inside of the diving suit.

17. An invention according to claims 9 or 10, in which the outer gas impermeable layers of each individual section are made of seamless rubber or plastic skin.

* * * * *